(12) United States Patent
Shi et al.

(10) Patent No.: US 10,616,125 B1
(45) Date of Patent: Apr. 7, 2020

(54) DYNAMIC ADJUSTMENT IN PRIORITY VALUES OF VALIDATION QUEUES

(71) Applicant: Facebook, Inc., Menlo Park, CA (US)

(72) Inventors: Yue Shi, San Jose, CA (US); Emanuel Alexandre Strauss, San Mateo, CA (US); Taiyuan Zhang, Fremont, CA (US); Lijun Tang, Menlo Park, CA (US); Yiqiu Liu, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 187 days.

(21) Appl. No.: 15/896,966

(22) Filed: Feb. 14, 2018

(51) Int. Cl.
    *G06F 15/16*     (2006.01)
    *H04L 12/863*     (2013.01)
    *G06F 16/958*     (2019.01)
    *G06Q 50/00*     (2012.01)
    *H04L 29/08*     (2006.01)

(52) U.S. Cl.
    CPC ........ *H04L 47/6235* (2013.01); *G06F 16/958* (2019.01); *G06Q 50/01* (2013.01); *H04L 67/1002* (2013.01)

(58) Field of Classification Search
    CPC .................................................. H04L 47/6235
    USPC ......................................................... 709/224
    See application file for complete search history.

(56) References Cited

U.S. PATENT DOCUMENTS

| | | | | |
|---|---|---|---|---|
| 6,026,368 A * | 2/2000 | Brown | ................... | G06Q 30/02 705/14.56 |
| 2008/0200191 A1 * | 8/2008 | Rao | ................... | H04M 1/72544 455/466 |
| 2008/0242280 A1 * | 10/2008 | Shapiro | ............ | H04N 21/25891 455/414.3 |
| 2009/0240807 A1 * | 9/2009 | Munson | ................... | H04L 67/26 709/226 |
| 2011/0235630 A1 * | 9/2011 | Hui | ......................... | H04L 12/66 370/352 |
| 2011/0276998 A1 * | 11/2011 | Griffin | ................ | H04L 47/2416 725/56 |
| 2012/0131601 A1 * | 5/2012 | McDysan | ........ | H04N 21/23805 725/1 |
| 2014/0108946 A1 * | 4/2014 | Olofsson | ................ | G06Q 50/01 715/739 |
| 2014/0195612 A1 * | 7/2014 | Guo | ..................... | H04L 67/1085 709/204 |
| 2014/0229445 A1 * | 8/2014 | Carter | ..................... | H04L 51/32 707/679 |
| 2014/0372516 A1 * | 12/2014 | Watte | ..................... | H04L 51/14 709/203 |

(Continued)

*Primary Examiner* — Hamza N Algibhah
(74) *Attorney, Agent, or Firm* — Fenwick & West LLP

(57) ABSTRACT

A social networking system validates content items based on policies regarding use of content items. The social networking system balances the validation process of content items with at least two validation queues, each having a priority value and some number of content items. A validation queue is selected based on the priority values. From the selected validation queue, a content item is determined to be valid or invalid. A validation efficiency for each queue is calculated based on the validated content items from each queue. The social networking system dynamically adjusts the priority value of each queue based on the validation efficiencies. The dynamic adjustment may be periodic. The social networking system may withhold invalid content items from users.

20 Claims, 4 Drawing Sheets

(56) References Cited

U.S. PATENT DOCUMENTS

| | | | |
|---|---|---|---|
| 2015/0156248 A1* | 6/2015 | Rao | H04L 67/141 |
| | | | 709/203 |
| 2016/0085744 A1* | 3/2016 | Dunn | G06F 17/2785 |
| | | | 705/39 |
| 2016/0294753 A1* | 10/2016 | Centner | H04L 51/12 |
| 2017/0068964 A1* | 3/2017 | Gevka | G06Q 30/018 |

* cited by examiner

DYNAMIC ADJUSTMENT IN PRIORITY VALUES OF VALIDATION QUEUES

FIELD OF INVENTION

The present disclosure generally relates to an online system balancing queues with content items to be validated.

BACKGROUND

A social networking system or other type of online system presents content items to its users. The content may be provided by third party content provider systems or by users of the social networking systems. The social networking system typically enforces policies in place specifying the attributes of content items that can be presented to users of the social networking system. The social networking system often receives content items that fail one or more policies. The social networking system typically withholds these content items from presentation to users of the social networking system. A social networking system may receive a very large number of content items. As a result, manual review of the content items quickly becomes infeasible due to the sheer number of content items to review. Any extended delay when reviewing content items uploaded into the content store prior to presentation to users of the social networking system can cause content providers to wait for their content items to be presented. Furthermore, a change in a policy may result in content items that are currently being provided to users to start violating the changed policy. Any delay in enforcing such policies causes content items that violate the policy to continue to be distributed to users.

SUMMARY

A social networking system or other type of online system presents content items to users of the social networking system. The social networking system enforces policies governing the types of content items that can be presented to users of the social networking system. These policies specify attributes of content items presented to users of the social networking system. For example, a policy may decide the type of language that can be used in a content item, the type of images that can be shown in the content item, certain aspects of presentation of the content item, and so on. The social networking system validates content items by checking if the content item violates any policy. Accordingly, the social networking system may determine that content items which violate one or more policies as defined by the social networking system are invalid content items. The social networking system may withhold content items invalid content items from users. In some embodiments, the social networking system removes invalid content items or flags the content items as being in violation of the policies.

The social networking system maintains a plurality of validation queues in which content items are placed to be reviewed. Each of the validation queues has a priority value. In one embodiment, the social networking system contains a proactive queue and a reactive queue where content items in the proactive queue are suspended for presentation pending validation and content items in the reactive queue are being currently sent to users for presentation but may be withheld if the content item is determined to be invalid, i.e., in violation of certain policies. The load balancer selects one of the validation queues based on the priority values of each validation queue. From the selected validation queue, the load balancer selects the next content item to be sent for validation. The social networking system checks whether content items are valid, i.e., in compliance with the policies or invalid, i.e., in violation of one or more policies. The load balancer calculates a validation efficiency for each queue based on the valid/invalid status of content items in each queue. The load balancer dynamically adjusts the priority value of each queue based on the validation efficiency of each queue. In one embodiment, the dynamic adjustment is periodic, such that after every time interval, the priority values of the queues are updated based on the validation efficiency of each queue. In some embodiments, the social networking system determines a gradient factor to either increase or decrease the weight of adjustment based on the validation efficiencies.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
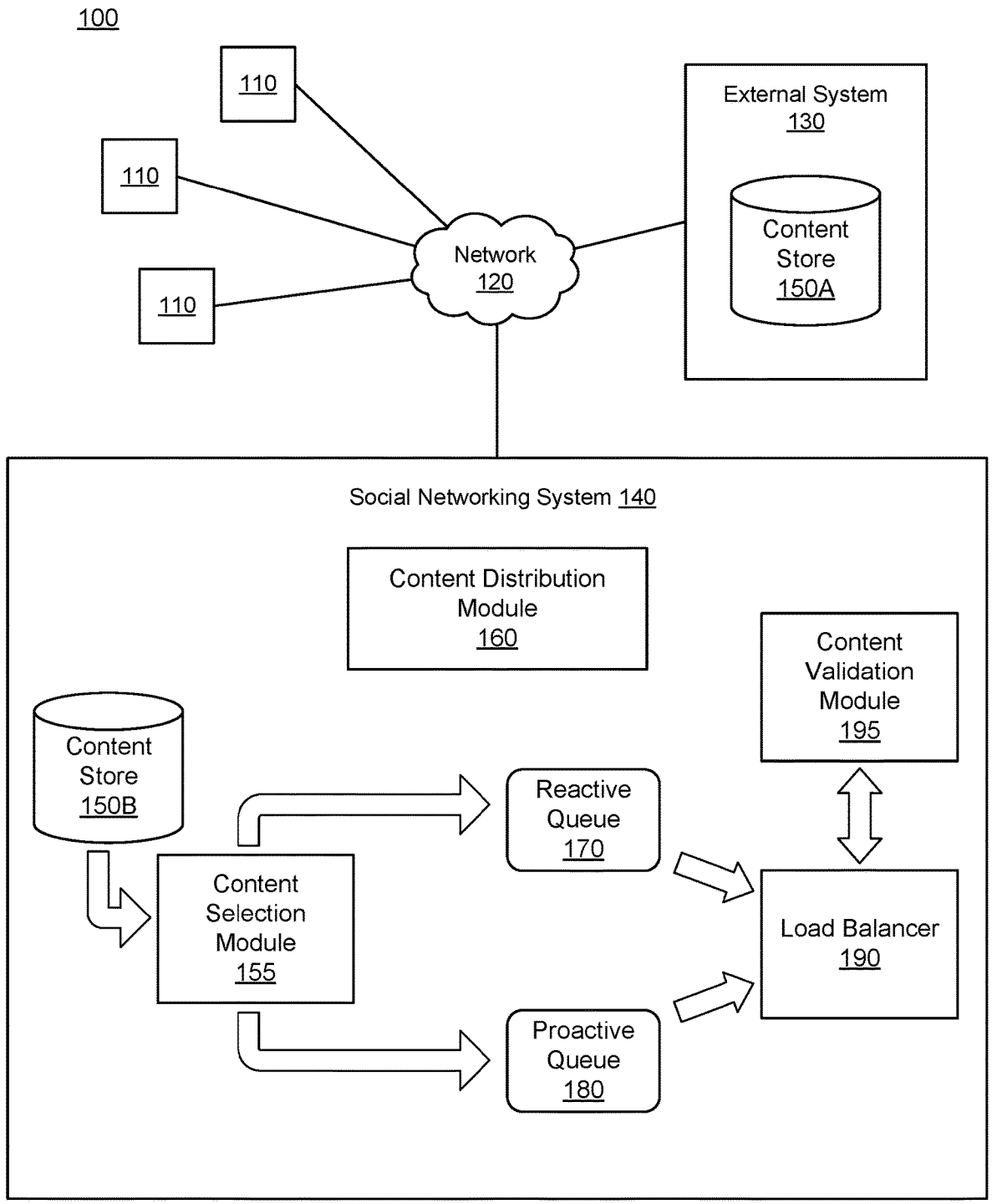
FIG. 1 is a system environment in which a social networking system operates, in accordance with an embodiment.

FIG. 1 is a system environment 100 in which a social networking system 140 (or other type of online system) operates. The social networking system 140 communicates with client devices 110 and an external system 130 through a network 120. In alternative configuration, different and/or additional components may be included in the system environment 100. For example, the system environment 100 may include multiple external systems 130 with which the social networking system 140 communicates. Although the embodiments disclosed herein describe a social networking system, the techniques disclosed herein are applicable to other online systems that store user profiles.

The client devices 110 are one or more computing devices capable of receiving user input as well as transmitting and/or receiving data via the network 110. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™. The client device 110 can receive content items from the social networking system 140 for display by the client device 110. In the above embodiments, the client device 110 may present content items via a browser application or an API running on the native operating system of the client device 110.

The client devices 110, the social networking system 140, and the external system 130 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more external systems 130 may be coupled to the network 120 for communicating with the social networking system 140. The external system 130 maintains a content store 150A which stores content items within the external system 130. The content store 150A is configured similarly to a content store 150B in the social networking system 140, in that the content store 150A stores content items for use by the external system 130. In one embodiment, an external system 130 is a content provider communicating content items to the social networking system 140. In an embodiment, the content items provided by the external system 130 are sponsored content items for which the external system 130 provides remuneration to the social networking system 140 for distributing the content items. An example of a sponsored content item is an advertisement. In other embodiments, the external system 130 provides content or other information for presentation directly to the client device 110. An external system 130 may also communicate other information to the social networking system 140, such as metadata describing content items stored by the external system 130. The social networking system 140 allows users to connect with other users while providing users with the ability of sharing content items for presentation to other users of the social networking system 140. Users of the social networking system 140 may upload content items into the content store 150B of the social networking system 140. Additionally, client devices 110 or external systems 130 may transmit content items to the social networking system 140 which may be stored in the content store 150B. The social networking system 140 enforces a set of policies describing the content items in the social networking system 140.

To ensure that content items uploaded into the content store 150B comply with the policies set by the social networking system 140, the social networking system 140 implements a process to validate content items to ensure content items sent to users are in compliance with the policies. A content selection module 155 within the social networking system 155 selects a content item for presentation to a user of the social networking system 140 for review of the content item for determining whether the content item is valid or invalid. In an embodiment, the content items may be reviewed by a software agent, for example, an expert system that analyzes the content item for potential violation of policies. The social networking system maintains a proactive queue and a reactive queue. Content items that are currently being presented to users are added to the reactive queue for review. Content items that have not yet been sent to any user are added to the proactive queue for review. For example, if there is a change in policies, content items that are currently being sent to users may have to be reviewed to ensure that they do not violate the changed policies. The content distribution module 160 distributes content items for presentation to the user of the social networking system 140.

Each of the validation queues has a priority value. A load balancer 190 selects between the reactive queue 170 and the proactive queue 180 based on the priority values of each. From the selected queue, the load balancer 190 selects the next content item to be sent to a content validation module 195 for validation. The content validation module 195 validates the content item based on one or more of the policies. Accordingly, the content validation module 195 determines that a content item is valid if the content item does not violate any policy of the social networking system and can be sent to users of the social networking system. The content validation module 195 determines that a content item is invalid if the content item violates policies of the social networking system and cannot be sent to users of the social networking system. In one embodiment, the content validation module 195 may invalidate any content item in violation of at least one policy. In another embodiment, the content validation module 195 may invalidate any content item in violation of more than a threshold number of policies. Upon validating or invalidating a content item, the content validation module 195 sends information describing the validation status of the content item to the load balancer 190.

The load balancer 190 calculates a validation efficiency for each queue based on the validation status of content items received from the content validation module 195. In one embodiment, the load balancer 190 calculates a validation efficiency by taking a percentage of content items validated, for example, a cumulative percentage over all content items ever validated in that queue or an aggregate percentage evaluated over a time interval such as a day. The load balancer 190 adjusts the priority value of the reactive queue 170 and the priority value of the proactive queue 180 based on the validation efficiency. The load balancer 190 may adjust the priority value at varying time intervals as well. In some embodiments, the calculation of the validation efficiency and/or the adjustment of priority values for each queue can be completed by the content validation module 195, alone or in concert with the load balancer 190.

Figure 2:
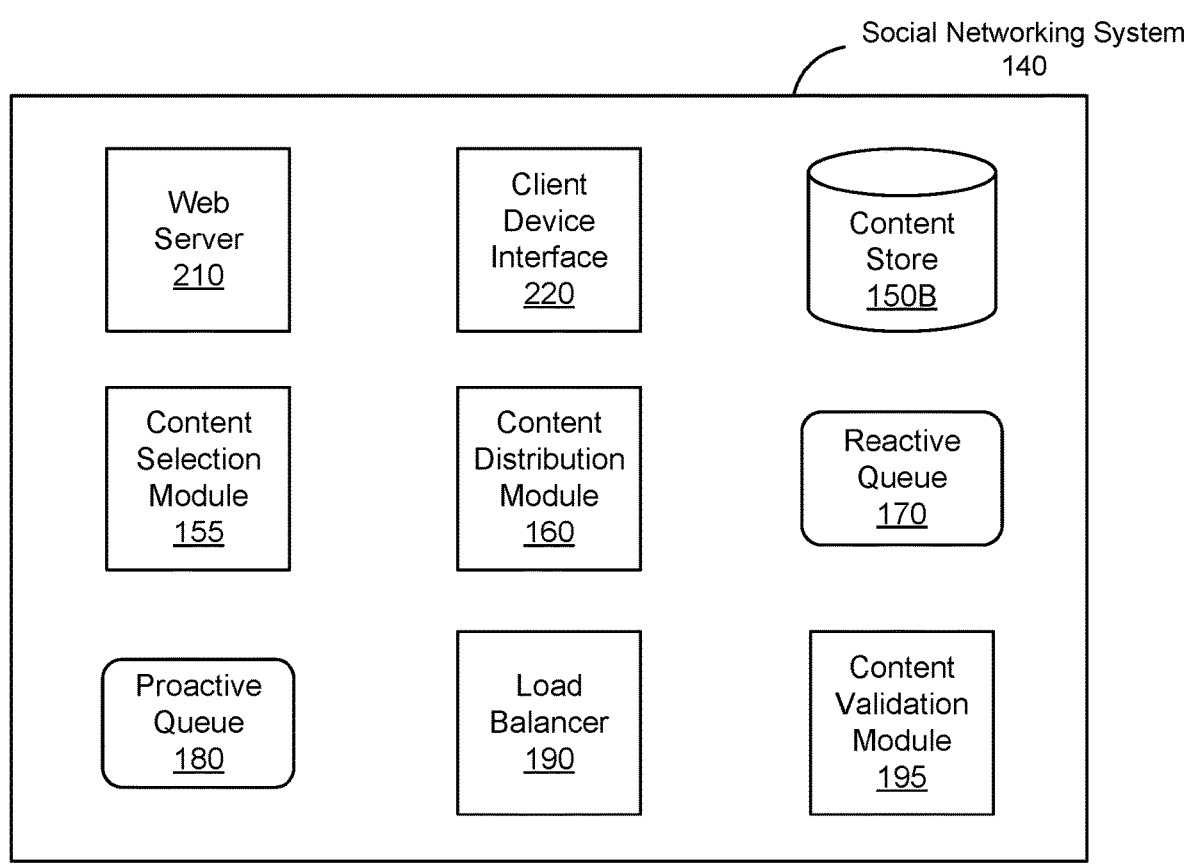
FIG. 2 is a system architecture for the social networking system of FIG. 1, in accordance with an embodiment.

FIG. 2 is a system architecture 200 for the social networking system 140 of FIG. 1, in accordance with an embodiment. The social networking system 140 includes various data stores and modules. Of the various data stores there are at least the content store 150B of FIG. 1, the reactive queue 170, and the proactive queue 180. Of the various modules there are at least a web server 210, a client device interface 220, the content selection module 155 of FIG. 1, the content distribution module 160 of FIG. 1, the load balancer 190 of FIG. 1, and the content validation module 195 of FIG. 1. In other embodiments, the system architecture 200 for the social networking 140 includes additional or fewer components than those mentioned (i.e., a user profile store, an edge store, etc.).

The web server 210 links the social networking system 140 via the network 120 of FIG. 1 to the one or more client devices 110 of FIG. 1, as well as to the one or more external systems 130 of FIG. 1. The web server 210 serves web pages, as well as other content, such as JAVA®, FLASH®, XML and so forth. The web server 210 may receive and route messages between the social networking system 140 and the client device 110, for example, instant messages, queued messages (e.g., email), text messages, short message service (SMS) messages, or messages sent using any other suitable messaging technique. A user may send a request to the web server 210 to upload information (e.g., images or videos) that are stored in the content store 150B. Additionally, the web server 210 may provide application programming interface (API) functionality to send data directly to native client device operating systems, such as IOS®, ANDROID™, or BlackberryOS.

The client device interface 220 communicates with the one or more client devices 110 of FIG. 1 via the web server 210 by establishing a connection with the one or more client devices 110. The client device interface 220 receives device information from the client devices 110. The device information of a client device 110 may indicate various characteristics of a device user. The device information may store various preferences or attributes as stored by the device user. In some embodiments, each client device 110 may have a unique identifier within the social networking system 140. In additional embodiments, the unique identifier is assigned to the device user. The client device interface 220 upon establishing connections to client devices 110 may transmit content items to the client devices 110 for presentation to the device users. The established connection can also be used by the client device 110 to share content items to the social networking system 140. In these situations, the client device interface 220 receives the uploaded content items and may direct them to storage in the content store 150B.

The content store 150B stores objects that represent various types of content. Examples of content represented by an object include a page post, a status update, a photograph, a video, a link, a shared content item, a gaming application achievement, a check-in event at a local business, a brand page, an advertisement, or any other type of content. Social networking system 140 users may create objects stored by the content store 150B, such as status updates, photos tagged by users to be associated with other objects in the social networking system 140, events, groups or applications. In some embodiments, objects are received from third-party applications or third-party system separate from the social networking system 140 such as external systems 130. Content items stored in the content store 150B may be tagged with various characteristics by the content store 150B. As mentioned in FIG. 1, the social networking system 140 has policies in place concerning the use of content items in the social networking system 140. In line with those policies, the content store 150B may tag content items describing whether the content item is in compliance, in violation, or in need of validation. In accordance with this present disclosure, the content store 150B receives a request by the content selection module 155 for presentation of a content item to a user of the social networking system 140. The content store 150B searches for content according to the request and sends the content to the content selection module 155.

In various embodiments, a content item includes various components capable of being identified and retrieved by the social networking system 140. Example components of a content item include: a title, text data, image data, audio data, video data, a landing page, a user associated with the content item, or any other suitable information. The social networking system 140 may retrieve one or more specific components of a content item for presentation in some embodiments. For example, the social networking system 140 may identify a title and an image from a content item and provide the title and the image for presentation rather than the content item in its entirety.

The content selection module 155 selects a content item from the content store 150B for presentation to a user of the social networking system 140. The content selection module 155 receives a request for presentation of a content item to a user of the social networking system 140. In some embodiments, the request comes from a client device via the client device interface 220. In some embodiments, the content selection module 155 retrieves the content item specified in the request. In other embodiments, the content selection module 155 identifies the user within the request and retrieves characteristics of the user. Then the content selection module 155 selects a content item in the content store 150B with targeting criteria which match a threshold number of the user's characteristics. The content selection module 155 sends the content item for review to reactive queue if the content item is currently being presented to the user and needs review. The content selection module 155 sends the content item for review to proactive queue if the content item has not been sent to users, for example, if the content item was just received from a content provider system.

The content distribution module 160 distributes content to users of the social networking system 140. The content distribution module 160 retrieves a content item from the content 150B. In some embodiments, the content distribution module 160 selects content items for sending to users based on bid amounts associated with content items. The content distribution module 160 uses the bid amounts associated with content items when selecting content for presentation to the user. In various embodiments, the content distribution module 160 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content distribution module 160 may rank content items based on their associated bid amounts and select content items having at least a threshold position in the ranking for presentation to the user. In some embodiments, the content distribution module 160 ranks both content items not associated with bid amounts and content items associated with bid amounts in a unified ranking based on bid amounts and measures of relevance associated with content items. Based on the unified ranking, the content distribution module 160 selects content for presentation to the user.

The content item may be tagged to be in compliance, in violation, or in need of validation. If the content item is in compliance, the content item can be directed to the various client devices 110 through the client device interface 220. If the content item is in violation, the content distribution module 160 may select another content item for sending to the user. In other embodiments, the content distribution module 160 chooses to withhold a content item based on the invalidation of the content item.

The reactive queue 170 and the proactive 180 are lists of content items to be validated by the content validation module 195. Both the reactive queue 170 and the proactive queue 180 have priority values which the load balancer 190 uses to select which queue to validate a content item from. In one or more embodiments, the priority values for the queues are complementary percentages. For example, the reactive queue 170 has a priority value of "70%" and the proactive queue 180 has a priority value of "30%" such that the two percentages sum to a whole "100%". Within each queue, a volume of content items are provided by the content selection module 155 for validation.

In some embodiments, the load balancer 190 manages the ranking of elements in each queue and selects content items from each queue based on the ranking. In an embodiment, a queue is a first in first out (FIFO) queue that implements ranking of content items wherein the ranking denotes position in the queue. As content items are placed in the queue, the content items are assigned the next ranking. As a queue is selected, the highest ranked content item is retrieved for validation while the remaining content items move up in the ranking. In other embodiments, the queues modify ranking of the content items. The reactive queue 170 contains content items which are currently being distributed by the content distribution module 160. The proactive queue 180 contains content items that have not yet been distributed.

In some embodiments, the load balancer 190 determines the ranks of content items within a queue based on a number of impressions of each content item. An impression refers to an instances of presentation of the content item to a user. Each impression of a content item may be presented to a distinct user. However the same user may be presented with the content items multiple times. In an embodiment, the load balancer 190 determines the ranks of content items in the reactive queue based on the number of past impressions of each content item. In an embodiment, the load balancer 190 determines the ranks of content items in a queue based on a measure of expected number of impressions of a content item. The load balancer 190 may determine the measure of expected number of impressions of a content item based on a request from a content provider. For example, the content provider that provides a content item to the social networking system may provide an estimate of the number of impressions that the content provider expects from the social networking system for the content item. In some embodiments, the social networking system may have started distributing the content item to users and measures the rate at which the content item is being presented to users. The social networking system uses the rate of distribution of the content item as a measure of expected number of impressions for a content item.

The load balancer 190 selects between the reactive queue 170 and the proactive queue 180 based on the priority values of each. Following the above example with the reactive queue 170 having the priority value of "70%" and the proactive queue 180 having the priority value of "30%", the load balancer 190 weights the reactive queue with 0.7 and the proactive queue with 0.3. The load balancer 190 generates a random fraction (e.g., with a random-number generator) to determine from which queue to select a content item for validation. In another method, the load balancer 190 chooses 70% content items from the reactive queue then chooses 30% content items from the proactive queue in a time interval before repeating the method of queue selection for subsequent time interval. Once the load balancer 190 selects one of the queues, the load balancer 190 selects a content item from the selected queue and directs the content item to the content validation module 195.

In response, the load balancer 190 receives a validation receipt from the content validation module 195. The validation receipt is an acknowledgement that describes whether the content item sent by the load balancer was in compliance (i.e., valid) or in violation of the social networking system 140 policies (i.e., invalid). The load balancer 190 calculates a validation efficiency for each queue based on the validation receipts for content items. In one embodiment, the load balancer 190 calculates a validation efficiency by taking a percentage of content items validated for each queue, wherein the percentage could be a cumulative percentage over all content items validated in that queue or the percentage could be over a time interval such as a day. For example, out of one hundred content items sent for validation from the reactive queue 170 in a day, fourteen could be invalidated with validation receipts reflecting as such. The load balancer 190 determines a validation efficiency of "14%" for the reactive queue. In complementary fashion, the load balancer 190 determines a validation efficiency of "86%" for the reactive queue describing a percentage of validated content items. In another embodiment, the load balancer 190 calculates a validation efficiency by counting total number of invalidated or validated items per queue. Additionally, the load balancer 190 can calculate the validation efficiency with normalizing the total number of invalidated or validated items from each queue over all queues as a percentage in comparison to other queues. In an example, the load balancer 190 determines a validation efficiency of "25%" for the proactive queue as twenty-five out of one hundred invalidated content items in a day came from the proactive queue.

The load balancer 190 adjusts the priority values for the reactive queue 170 and the proactive queue 180 based on the validation efficiencies for each. As the load balancer 190 adjusts the priority values of each queue, the load balancer 190 could adjust the priority values every some number of validation receipts (e.g., every 100 validation receipts) according to one embodiment. In another embodiment, the load balancer 190 adjusts the priority values of each queue after a certain time interval (e.g., every hour).

In one embodiment, the load balancer 190 increases the priority value of the queue with the higher validation efficiency, wherein the higher validation efficiency describes the queue that validated or invalidated a higher percentage of checked content items. For example, the validation efficiency of the reactive queue 170 is "23%" and that of the proactive queue 180 is "18%" so the load balancer 190 increases the priority value of the reactive queue 170. In an additional embodiment, the load balancer 190 decreases priority value of the queue with the lower validation efficiency, wherein the lower validation efficiency describes the queue that validated or invalidated a lower percentage of checked content items. Continuing the example, the load balancer additionally decreases the priority value of the proactive queue 180.

In one implementation, the load balancer 190 adjusts the priority values of the queues based on the validation efficiencies for each queue according to the following equation:

$$\frac{w_p}{w_r} = \frac{b_p + \alpha \frac{m_p}{m_p + m_r}}{b_r + \alpha \frac{m_r}{m_p + m_r}}. \quad (1)$$

Wherein the variables are defined as follows: w represents the modified priority values for the queues with $w_p$ representing the modified priority value for the proactive (p) queue and $w_r$ representing the modified priority value for the reactive (r) queue; b represents the current priority values for the queues with $b_p$ representing the current priority value for the proactive (p) queue and the $b_r$ representing the current priority value for the reactive (r) queue; m represents the validation efficiencies with $m_p$ representing the validation efficiency for the proactive (p) queue and $m_r$ representing the validation efficiency for the reactive (r) queue; and a represents the transition smoothness factor. In this implementation, the priority values are adjusted starting from the current priority values as a basis. Each validation efficiency is normalized against the sum of validation efficiencies, ($m_p$+$m_r$). The smoothness factor may be pre-defined so as to balance adjustment of the priority values. The smoothness factor, for example, could be set at 0.1, 0.5, 1, 2, 5, or 10. Taking a numerical example of this implementation, assuming that priority values are complementary percentages the sum of modified priority values ($m_p$+$m_r$) must also equate to 1. Taking current priority values of 0.5 for $b_p$ and 0.5 for $b_r$, with a smoothness factor α set at 0.5, and validation efficiencies calculated to be 0.34 for $m_p$ and 0.16 for $m_r$, the load balancer 190 calculates the modified priority values with equation (1) to be 0.56 for $w_p$ and 0.44 for $w_r$, so as to maintain complementary percentages. As an observance, 0.34 for $m_p$ being the higher validation efficiency causes the priority value for the proactive queue to increase from 0.5 for $b_p$ to 0.56 for $w_p$.

The content validation module 195 validates content items based on their reviews. The content validation module 195 receives a content item from the load balancer 190. In some embodiments, a tag indicating the queue from which the content item was selected from accompanies the content item. The content validation module 195 performs a set of validation tests which determine whether the content items being reviewed comply with or violate the policies maintained by the social networking system 140. The content validation module 195 may perform each test simultaneously or consecutively, wherein each test considers one or more policies. In some embodiments, the content validation module 195 reviews content items considering a subset of the policies. The subset of policies are prioritized in the review process in that the content validation module 195 may validate a content item only determined to comply with the subset of policies. In other embodiments, the content validation module 195 validates content items which pass a threshold number of validation tests. After the content validation module 195 performs the validation tests on each content item, the content validation module 195 validates or invalidates each content item according to whether the content item sufficiently complies with the policies. Validated content items are content items determined by the content validation module 195 as complying with the policies of the social networking system and therefore approved for sending to users of the social networking systems; whereas, invalidated content items are content items determined by the content validation module 195 and not sufficiently complying with the policies which therefore may have to be withheld from all or a subset of users of the social networking system unless they are modified to comply with the policies. The content validation module 195 prepares a validation receipt for each content item reviewed including both an identifier of the content item and the result of the review (validated or invalidated). Accordingly, the content validation module 195 sends the validation receipt to the load balancer 190. Although the review process described in the above embodiments arrives at a binary result of validated or invalidated, in other embodiments the content validation module 195 may determine a percentage of compliance for each content item. In some embodiments, the content validation module 195 may determine that the content item is valid with respect to some users but bit valid for others, for example, the content item may be valid for adult users but invalid for users below certain age. Additionally in some embodiments, the process of calculating the validation efficiency for each queue and adjusting priority values based on the validation efficiencies as described in the load balancer 190 are accomplished by the content validation module 195.

In response to reviewing content items, the social networking system 140 may remove invalidated content items. The content validation module 195 may additionally send the validation receipt to the content store 150B for disciplinary actions. The content store 150B may tag the invalidated content items removing their eligibility for presentation other users of the social networking system 140. Likewise upon receiving validation receipts of validated content items, the content store 150B may tag the validated content items as validated, thereby making them eligible for presentation to other users without needing to be reviewed again.

Figure 3:
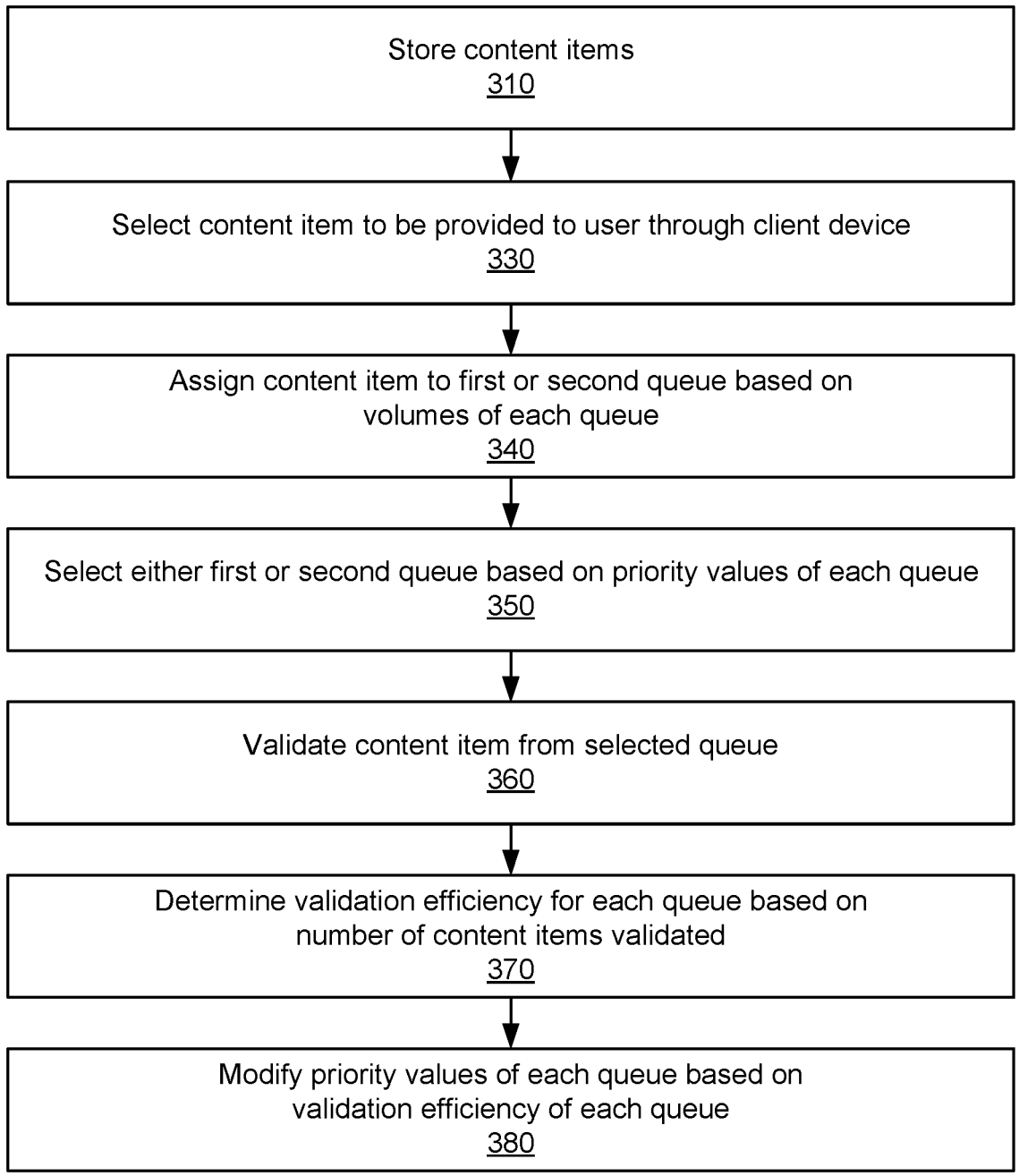
FIG. 3 is a flowchart of the method of dynamically adjusting priority values of queues in reviewing content items, in accordance with an embodiment.

FIG. 3 is a flowchart of the method 300 of dynamically adjusting priority values of queues in reviewing content items, in accordance with an embodiment. Various steps of the method 300 of dynamically adjusting priority values of queues in reviewing content items by the social networking system 140 may be accomplished by the various modules of the social networking system 140.

The method 300 begins with storing 310 content items in the social networking system 140. The social networking system 140 stores 310 content items as uploaded by various users of the social networking system 140. This step of storing 310 content items is accomplished by the content store 150B. In addition to storing 310 content items, the social networking system 140 maintains a set of policies concerning use of the content items stored in the content store 150B. Content items stored in the social networking system 140 need to be reviewed for compliance with the policies. Additionally, other modules may provide the content items to the content store 150B or additional information regarding content items in the content store 150B. These other modules may include the client device interface 220 providing user-inputted information and the content validation module 195 providing validation receipts indicating validation or invalidation of content items in the content store 150B.

Then the method 300 selects 330 a content item to be provided to the requesting social networking system user. The content selection module 155 processes the request. In some embodiments, the request specifies a content item to be retrieved from the content store 150B by the content selection module 155; whereas, in other embodiments, the request prompts the content selection module 155 to select a content item form the content store 150B with targeting criteria matching the requesting social networking system user's characteristics. Once a content item is selected by the content selection module 155, the content selection module 155 evaluates whether the selected content item needs to be reviewed to ensure compliance with the policies set by the social networking system 140. Content items which have yet to be reviewed are defined as unreviewed content items. If the content item is an unreviewed content item, the content selection module 155 sends the unreviewed content item for review.

The method 300 proceeds with assigning 340 the unreviewed content item to a first queue or a second queue based whether the content item is currently being distributed to users or not. The first queue and the second queue can function identically in that both queues maintain a list of content items to be reviewed. In this embodiment, either the first queue or the second queue is the reactive queue 170 with the remaining queue as the proactive queue 180. In some embodiments, the content selection module 155 assigns the unreviewed content item to the reactive queue if the content item is currently being distributed to users and assigned to the proactive queue if the social networking system just received the content item and has not yet started distributing the content item to users.

Between each of the two queues, the method 300 includes selecting 350 either the first queue or the second queue by the load balancer 190 based on priority values of each queue. The two queues may be initialized with priority values by the load balancer 190. In one embodiment, the priority values are complementary percentages. Additionally, the load balancer 190 may initialize the priority values of each queue to be equal. The load balancer 190 selects one of the two queues based on the priority values of each queue. In some embodiments, the load balancer 190 utilizes a random number generator with the priority values for each queue to determine which queue to review an unreviewed content item. Once a queue is selected, the load balancer 190 selects an unreviewed content item to be reviewed.

The method 300 continues with validating 360 the unreviewed content item from the selected queue. In some embodiments, the load balancer 190 sends the unreviewed content item to the content validation module 195. The content validation module 195 validates the unreviewed content item to be either valid or invalid according to the policies. In some embodiments, the content validation module 195 validates the unreviewed content item to be valid for content items that comply with a threshold subset of policies.

The method 300 then determines 370 validation efficiencies for each queue based on number of content items validated. The step of determining 370 validation efficiencies for each queue can be calculated in different processes. Many processes are discussed above in conjunction with the load balancer 190; however, the same processes of calculating the validation efficiencies may be accomplished by the content validation module 195. One process calculates a validation efficiency as the percentage of content items validated as invalid from a queue during an interval of time. Another process calculates a validation efficiency as a total number of content items validated as invalid from all content items validated as invalid during an interval of time. Simulated results of two processes of calculating validation efficiencies are described below in conjunction with FIGS. 4A & 4B.

The method 300 then modifies 380 the priority values of each queue based on validation efficiencies of each queue. The step of modifying 380 the priority values of each queue based on validation efficiencies of each queue can be calculated in different processes. Many processes are discussed above in conjunction with the load balancer 190; however, the same processes of calculating the validation efficiencies may be accomplished by the content validation module 195. One process utilizes the equation (1) as discussed in conjunction with FIG. 2. Simulated results of two processes of calculating validation efficiencies are described below in conjunction with FIGS. 4A & 4B.

In additional embodiments, the steps of determining 370 validation efficiencies for each queue and modifying 380 priority values for each queue based on validation efficiencies occur periodically. For example, the priority values may be initialized at the beginning of a day. Then throughout the day, the validation efficiencies are periodically calculated every hour. As the validation efficiencies change slightly throughout the day, the priority values may also be adjusted periodically every hour.

The method 300 may continue with receiving a request for a content item from a client device associated with a social networking system user. The request for the content item may be received by the social networking system 140 via the client device interface 220. The request for the content item is sent to the content distribution module 160 to retrieve a content item matching the request. The content distribution module selects a content item that has been determined to be valid and sends the selected content item to the user.

Figure 4A:
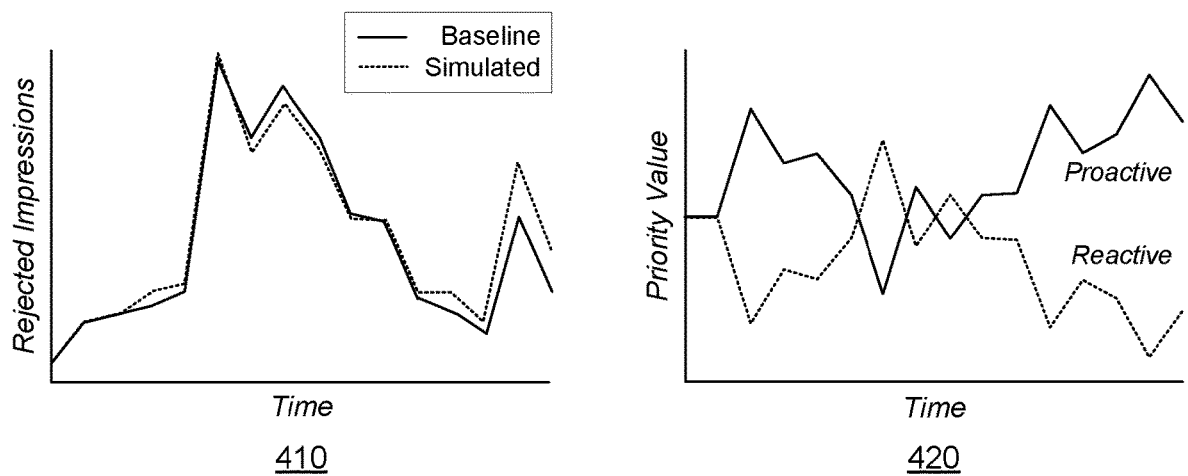
FIG. 4A is a pair of graphs showing results of a first trial of a first process in dynamically adjusting priority values based on total number of rejected impressions per queue, in accordance with an embodiment.

FIG. 4A is a pair of graphs showing results of a first trial of a first process in dynamically adjusting priority values based on total number of rejected impressions per queue, in accordance with an embodiment. Rejected impressions are synonymous to invalid content items after validation by the content validation module 195. In this first trial, the validation efficiencies for each queue are calculated taking total number of rejected impressions per queue. Initially, the priority values for both queues are set at 0.5. The rejected impressions from both queues at any given time is shown on the first graph 410 with the solid line showing a baseline without adjusting priority values and the dotted line showing the first trial. The simulated adjusted priority values for the first trial at any given time is shown on the second graph 420 with priority values for both the proactive queue and the reactive queue. As the priority values are adjusted periodically, the rejected impressions from both queues in the first trial differ from the baseline. After the first trial, the rejected impressions from both queues are integrated for the first trial and for the baseline to determine total rejected impressions for the first trial and for the baseline. Noticeably, the first trial's total rejected impressions is greater than the baseline's total rejected impressions.

Figure 4B:
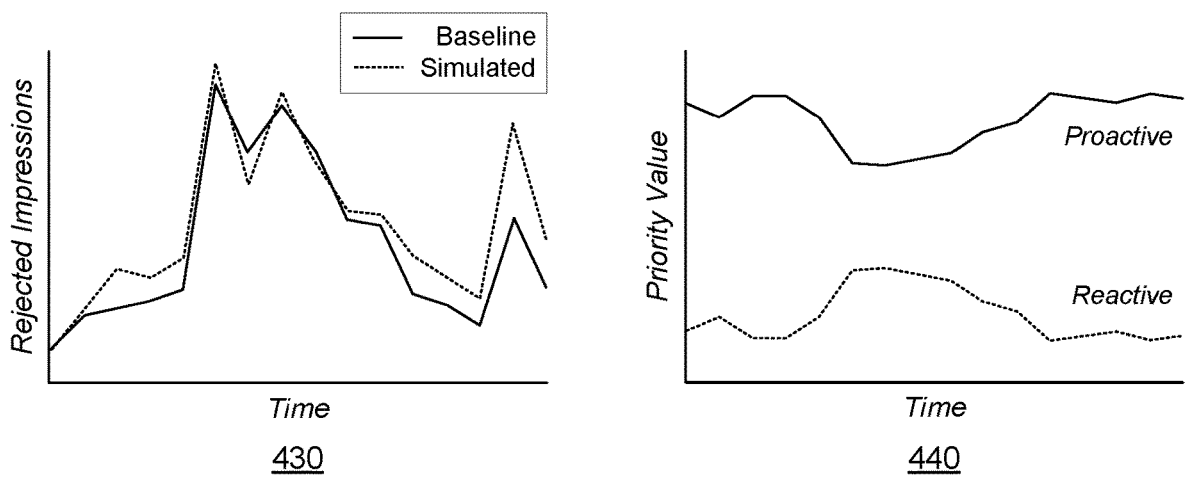
FIG. 4B is a pair of graphs showing results of a second trial of a second process in dynamically adjusting priority values based on percentage of rejected impressions per queue, in accordance with an embodiment.

FIG. 4B is a pair of graphs showing results of a second trial of a second process in dynamically adjusting priority values based on percentage of rejected impressions per queue, in accordance with an embodiment. Similarly, rejected impressions are synonymous to invalid content items after validation by the content validation module 195. In this second trial, the validation efficiencies for each queue are calculated taking percentage of rejected impressions per queue. Initially, the priority values for both queues are set at where the priority value for the proactive queue is greater than that of the reactive queue. The rejected impressions from both queues at any given time is shown on the third graph 430 with the solid line showing a baseline without adjusting priority values and the dotted line showing the second trial. The simulated adjusted priority values for the second trial at any given time is shown on the fourth graph 440 with priority values for both the proactive queue and the reactive queue. As the priority values are adjusted periodically, the rejected impressions from both queues in the second trial differ from the baseline. After the second trial, the rejected impressions from both queues are integrated for the second trial and for the baseline to determine total rejected impressions for the second trial and for the baseline. Noticeably, the second trial's total rejected impressions is greater than the baseline's total rejected impressions.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising: storing a plurality of content items at an online system; selecting a subset of content items from the plurality of content items to be provided to users of the online system; assigning the content items from the subset of content items to one of a plurality of queues, wherein each queue has a priority value; for each of the plurality of queues: selecting a content item from the queue based at least in part on the queue's priority value for validation; validating the selected content item from that queue, the validation based on whether the selected content item violates one or more policies of the social networking system; determining a validation efficiency based on a number of content items validated from the queue; modifying the priority values of the plurality of queues based at least in part on the validation efficiencies; receiving, at the online system, a request for a content item from a client device associated with a user of the online system; and responsive to the received request for the content item, sending a content item determined to be valid based on the validation.

2. The computer-implemented method of claim 1 further comprising, for each of the plurality of queues: ranking content items within the queue based on an expected measure of number of instances of presentation of each content item to users.

3. The computer-implemented method of claim 1, wherein the plurality of queues comprises a reactive queue comprising content items that are currently being sent to users by the social networking system.

4. The computer-implemented method of claim 3, wherein the plurality of queues further comprises a proactive queue comprising content items that have not yet been sent to users of the social networking system, wherein the priority value of the reactive queue is determined to be higher than the priority value of the proactive queue.

5. The computer-implemented method of claim 1, wherein the priority values of the plurality of queues are complementary percentages.

6. The computer-implemented method of claim 5, wherein, for each of the plurality of queues: selecting a content item from the queue based at least in part on the queue's priority value comprises utilizing a random number generator with the queue's priority value.

7. The computer-implemented method of claim 1, wherein, for each of the plurality of queues: validating the selected content item from that queue, the validation based on whether the selected content item violates one or more policies of the social networking system comprises determining whether the selected content item is valid or invalid based on a threshold number of policies that are violated by the selected content item.

8. The computer-implemented method of claim 1, wherein modifying the priority values of the plurality of queues based at least in part on the validation efficiencies of the plurality of queues comprises increasing the priority value of the queue with a largest validation efficiency.

9. The computer-implemented method of claim 1, wherein modifying the priority values of the plurality of queues based at least in part on the validation efficiencies of the plurality of queues comprises increasing the priority value of the queue with a smallest validation efficiency.

10. The computer-implemented method of claim 1, wherein the validation efficiency is based on a number of content items validated from the queue over an interval of time.

11. A non-transitory computer-readable storage medium storing instruction that, when executed by a processor, cause the processor to: store a plurality of content items at an online system; select a subset of content items from the plurality of content items to be provided to users of the online system; assign the content items from the subset of content items to one of a plurality of queues, wherein each queue has a priority value; for each of the plurality of queues: select a content item from the queue based at least in part on the queue's priority value for validation; validate the selected content item from that queue, the validation based on whether the selected content item violates one or more policies of the social networking system; determine a validation efficiency based on a number of content items validated from the queue; modify the priority values of the plurality of queues based at least in part on the validation efficiencies of the plurality of queues; receive, at the online system, a request for a content item from a client device associated with a user of the online system; and responsive to the received request for the content item, send a content item determined to be valid based on the validation.

12. The non-transitory computer-readable storage medium of claim 11 storing further instructions that, when executed by the processor, cause the processor to, for each of the plurality of queues, rank content items within the queue based on an expected measure of number of instances of presentation of each content item to users.

13. The non-transitory computer-readable storage medium of claim 11, wherein the plurality of queues comprises a reactive queue comprising content items that are currently being sent to users by the social networking system.

14. The non-transitory computer-readable storage medium of claim 13, wherein the plurality of queues further comprises a proactive queue comprising content items that have not yet been sent to users of the social networking system, wherein the priority value of the reactive queue is determined to be higher than the priority value of the proactive queue.

15. The non-transitory computer-readable storage medium of claim 11, wherein the priority values of the plurality of queues are complementary percentages.

16. The non-transitory computer-readable storage medium of claim 15, wherein to, for each of the plurality of queues: select a content item from the queue based at least in part on the queue's priority value comprises instructions that cause the processor to utilize a random number generator with the queue's priority value.

17. The non-transitory computer-readable storage medium of claim 11, wherein to, for each of the plurality of queues: validate the selected content item from that queue, the validation based on whether the selected content item violates one or more policies of the social networking system comprises instructions that cause the processor to determine whether the selected content item is valid or invalid based on a threshold number of policies that are violated by the selected content item.

18. The non-transitory computer-readable storage medium of claim 11, wherein to modify the priority values of the plurality of queues based at least in part on the validation efficiencies of the plurality of queues comprises instructions that cause the processor to increase the priority value of the queue with a largest validation efficiency.

19. The non-transitory computer-readable storage medium of claim 11, wherein to modify the priority values of the plurality of queues based at least in part on the validation efficiencies of the plurality of queues comprises instructions that cause the processor to increase the priority value of the queue with a smallest validation efficiency.

20. The non-transitory computer-readable storage medium of claim 11, wherein the validation efficiency is based on a number of content items validated from the queue over an interval of time.

* * * * *